United States Patent [19]

Hara et al.

[11] 4,313,019

[45] Jan. 26, 1982

[54] METHOD FOR PRODUCING LOW MOLECULAR WEIGHT POLYMER

[75] Inventors: Hajime Hara, Fujisawa; Atsushi Kaiya; Yoshihiko Araki, both of Kawasaki, all of Japan

[73] Assignee: Nippon Oil Co., Ltd., Japan

[21] Appl. No.: 856,638

[22] Filed: Dec. 2, 1977

[30] Foreign Application Priority Data

Dec. 6, 1976 [JP]  Japan ............................... 51-146345
Dec. 7, 1976 [JP]  Japan ............................... 51-146208

[51] Int. Cl.$^3$ ............................................ C07C 11/02
[52] U.S. Cl. ................................... 585/429; 585/517; 585/507
[58] Field of Search ................... 260/680 B; 585/507, 585/429, 424, 517

[56] References Cited

U.S. PATENT DOCUMENTS

| | | | |
|---|---|---|---|
| 3,306,949 | 2/1967 | Mertzweiler et al. | 260/680 B |
| 3,324,191 | 6/1967 | Wofford | 260/680 B |
| 3,789,090 | 1/1974 | Otsuki et al. | 260/680 B |

*Primary Examiner*—Delbert E. Gantz
*Assistant Examiner*—Joseph A. Boska
*Attorney, Agent, or Firm*—Ostrolenk, Faber, Gerb & Soffen

[57] ABSTRACT

In a method for producing a low molecular weight polymer or copolymer by introducing metallic sodium or an organic sodium compound as a polymerization initiator, an alkyl aryl compound as a chain transfer agent, an inert hydrocarbon as a solvent and a conjugated diolefin or both a conjugated diolefin and a vinyl compound having anionic copolymerization activity with diolefins as a monomer or monomers, into a polymerization vessel and polymerizing or copolymerizing therein successively at a temperature of 0° to 100° C., the improvement in the method for producing a low molecular weight polymer or copolymer having a number average molecular weight of 300 to 10,000 with good reproducibility is characterized in that 0.05 to 10 mole % per 1 mole of the said polymerization initiator, of oxygen is fed into said polymerization vessel.

8 Claims, No Drawings

4,313,019

METHOD FOR PRODUCING LOW MOLECULAR WEIGHT POLYMER

BACKGROUND OF THE INVENTION

This invention relates to a method for producing a low molecular weight polymer by polymerizing or copolymerizing a conjugated diolefin in the presence of an inert hydrocarbon solvent a specific chain transfer agent and a polymerization initiator selected from metallic sodium and organic sodium compounds in which method the molecular weight of obtained polymer or copolymer can be controlled reproducibly. More particularly, the method is characterized in that oxygen is fed into the polymerization vessel when polymerization or copolymerization is carried out by successively introducing the solvent, chain transfer agent, polymerization initiator and monomer or monomers into the polymerization vessel.

Liquid low polymers which are made by polymerizing conjugated dienes such as butadiene and isoprene have been hitherto used for a wide variety of purposes, for example, thermosetting resins, synthetic drying oils, sealing agents, baking paints, rubber additives and various chemical intermediates, since such liquid low polymers have many unsaturated bonds in their molecules. However, it is necessary to employ a polymer having the most suitable fluidity when it is used for each purpose. In other words, a liquid low molecular weight polymer which has a suitable viscosity must be used for each purpose. The fluidity of a liquid low polymer depends predominately upon the molecular weight of the polymer so that it has long been desired to keep the molecular weight of the liquid low polymer under exact control.

As the method for controlling molecular weight, for example, what is called living polymerization is known in which polycyclic aromatic compound sodium complex is used as a polymerization initiator in a polar solvent such as tetrahydrofuran.

In this method, however, only one molecular of a polymer is produced per one molecule of a polymerization initiator. A quite large quantity of a initiator is required for the preparation of a low molecular weight polymer, and further, a relatively expensive solvent must be employed in the reaction.

It is well known that toluene or the like is used as a chain transfer agent when a conjugated diene such as butadiene is polymerized in the presence of a polymerization initiator such as metallic sodium or organic sodium compounds. In this method, the low molecular weight polymer is produced by chain transfer reaction with the toluene. Further, this method is advantageous in that the quantity of a polymerization initiator used is small and the raw materials for the reaction are inexpensive as compared with the above-mentioned living polymerization method.

In accordance with the latter method, a polymer having a number average molecular weight of 300 to 10,000 can be produced easily by controlling the concentrations of polymerization initiator, chain transfer agent and monomer.

The present inventors have found out, however, that the molecular weight of the obtained polymer cannot be well controlled with reproducibility when the above polymerization is carried out successively in a relatively large-scaled equipment.

That is, when the polymerization is carried out at given raw material concentration, at a given temperature, pressure and stirring condition in a sealed polymerization vessel it was found that the average molecular weight or the viscosity of reaction product sometimes rose abruptly. These phenomena will be shown in the Comparative Examples described below. Therefore, the reproducible production of polymers having well controlled molecular weights cannot be expected.

BRIEF SUMMARY OF THE INVENTION

In order to eliminate the above-described drawbacks in the conventional art, the present inventors have carried out wide and extensive studies, and as a result, the present invention has been accomplished. That is, they have found out that, even when the polymerization is successively performed, the molecular weight of polymer product can be well controlled, and in addition, the polymerization can be reproducibly performed by supplying the polymerization vessel with oxygen.

It is, therefore, the primary object of the present invention to provide an improved method for producing a low molecular weight polymer without any disadvantages which one encounters in the conventional art methods.

Another object of the present invention is to provide a method for producing a low molecular weight polymer in which the molecular weight of the obtained polymer can be well controlled.

A further object of the present invention is to provide a method for producing a low molecular weight polymer with reliability.

Still a further object of the present invention is to provide a method for producing a low molecular weight polymer without any difficulty and trouble.

In the method of the present invention for producing a low molecular weight polymer or copolymer having a number average molecular weight of 300 to 10,000, a polymerization vessel is supplied with a polymerization initiator selected from metallic sodium and organic sodium compounds, a chain transfer agent of alkyl aryl compound which is represented by the general formula: $Ar-CR_1R_2H$ (in which Ar is an aryl group and each of $R_1$ and $R_2$ is a hydrogen atom or an alkyl group having 1 to 20 carbon atoms), a solvent of inert hydrocarbon, and a monomer of conjugated diolefin or monomers of both conjugated diolefin and vinyl compound having anionic copolymerization activity with diolefins, and then the contents were subjected to polymerization or copolymerization successively at a temperature of 0° to 100° C. The present invention is characterized in that, in the above reaction, 0.05 to 10 mole % (per mole of used polymerization initiator) of oxygen is fed into the above polymerization vessel.

DETAILED DESCRIPTION OF THE INVENTION

The metallic sodium that is used as a polymerization initiator in the present invention is one which is pulverized to about 1 to 100 microns in average particle diameter in an inert dispersion medium of benzene, hexane, heptane or the like. Another polymerization initiator of a organic sodium compound may be typically exemplified by NaR (in which R is a hydrogen atom or an organic radical having 1 to 20 carbon atoms such as alkyl, aryl or aralkyl group) or the complex of sodium with polycyclic aromatic compound. For example, benzyl sodium, diphenylmethyl sodium, butadiene sodium, phenyl sodium, ethyl sodium, amyl sodium and nephthalene-sodium complex can be advantageously used.

In the method of the present invention, the following benzyl sodium type organic sodium compounds can be advantageously used. The example of the benzyl sodium type organic sodium compound (such as benzyl sodium or $C_6H_5 \cdot CNa(CH_3)_2$ which is prepared by transmetalation of an alkaryl compound) is the one produced by allowing an organic sodium compound to react with an alkaryl compound at a temperature of 0° to 100° C., if necessary using an inert hydrocarbon solvent. The above organic sodium compound has 1 to 20 carbon atoms and obtained by causing a hydrocarbon halide having 1 to 20 carbon atoms to react with metallic sodium at a temperature of 0° to 100° C., if necessary in the presence of an inert hydrocarbon solvent. The above alkaryl compound is exemplified by toluene, cumene and xylene which are represented by the same general formula as that for the chain transfer agent described below. Another example of the benzyl sodium type organic sodium compound is the one which is obtained by allowing the above alkaryl compound, the above hydrocarbon halide and metallic sodium to react together at a temperature of 0° to 100° C. using, if necessary, an inert hydrocarbon solvent. These polymerization initiators may also be used by dissolving or dispersing them into the below-mentioned inert hydrocarbon solvent and/or the chain transfer agent.

The chain transfer agents which are used in the method of the present invention are alkaryl compounds, particularly alkyl benzene, which are represented by the general formula: $Ar-CR_1R_2H$, in which the symbol Ar represents an aryl group and each of $R_1$ and $R_2$ represents a hydrogen atom or an alkyl group having 1 to 20 carbon atoms. Exemplified as typical are toluene, xylene, ethylbenzene, cumene, mesitylene and durene.

The solvents for polymerization used in the method of the present invention are inert hydrocarbons generally having 4 to 20 carbon atoms such as benzene, hexane, heptane, and cyclohexane.

The monomers which are used for the method of the present invention are conjugated diolefins having generally 4 to 10 carbon atoms, such as butadiene, isoprene, piperylene and 2,3-dimethyl-1,3-butadiene. These monomers can be used solely or as a mixture of two or more. Further, vinyl compounds having anionic polymerization activity such as styrene, α-methylstyrene and other unsaturated compounds can be used as co-monomers together with the above conjugated diolefins so as to prepare copolymers.

In the method of the present invention, the polymerization is successively carried out by using the above raw materials at a temperature in the range of 0° to 100° C., preferably 20° to 80° C., and most preferably 25° to 55° C. When the polymerization temperature is too high, the obtained polymer is colored, and on the contrary, when the polymerization temperature is too low, the rate of reaction becomes too low to obtain the polymer in the good yield.

The successive polymerization referred to in the present invention means that the above-mentioned raw materials are continuously supplied into a polymerization vessel and the produced polymer is continuously taken out from the polymerization vessel, or that given quantities of raw materials are fed into a polymerization vessel, and after a certain polymerization time, the produced polymer is taken out from the polymerization vessel by displacing it with an inert solvent such as benzene and/or an inert gas such as nitrogen gas without deactivating the polymerization initiator in the polymerization vessel. The latter polymerization method is what is called continuous batch system. These successive polymerization processes are quite advantageous in industrial production since the polymerization can be performed without the interruption of washing and drying of polymerization vessel. When the low molecular weight polymer of the present invention as described above was produced, however, it was found that the molecular weight or the viscosity of polymer was sometimes raised suddenly even when the same quantities of raw materials were fed into the same polymerization vessel.

The present invention has been made in order to eliminate this defect. That is, the present invention is characterized in that, when the continuous polymerization is carried out, 0.05 to 10 mole %, preferably 0.5 to 5 mole %, of oxygen per 1 mole of polymerization initiator is added to the polymerization vessel. As oxygen to be supplied, it may be the pure oxygen gas, the oxygen diluted with nitrogen gas or air itself. Also used as the oxygen source is a compound which substantially produces oxygen molecules in the reaction system. It is, however, desirable to use oxygen which is diluted with nitrogen or air as the oxygen source. Further, oxygen can be supplied by dissolving it into the solvent or monomers.

If the quantity of oxygen to be added is too small, the effect of the addition cannot be expected, while if the quantity is too large, not only the yield of polymer decreases and the very low molecular weight polymer is produced but also there occurs the fear of explosion.

In the method of the present invention, it is desirable that the oxygen is supplied into the liquid phase polymerization system through a feeding pipe. However, when the oxygen containing gas is used, it can be supplied into the gas phase of the polymerization system. Further, the supply of oxygen can be attained by previously adding it into the monomer, the chain transfer agent, the solvent and/or the polymerization initiator that are to be fed into the polymerization vessel. In this case, oxygen can be fed into the reaction vessel together with the flow of materials to be fed.

The addition temperature of oxygen is not especially restricted and may be within the range of 0° to 100° C. Further, the temperature of oxygen may be made the same as those of the monomer, the chain transfer agent and the other materials that are fed into the reaction vessel.

When oxygen is mixed with a polymerization initiator and then fed into a reaction vessel, the temperature thereof may be within a wide range of −78° to 100° C., preferably 0° to 80° C. However, an ordinary temperature is convenient and satisfactory. If the polymerization initiator is dispersed or dissolved in a liquid hydrocarbon like the foregoing inert solvent or chain transfer agent, oxygen may be blown into the dispersion or solution.

In the method of the present invention, it is preferable that the oxygen containing gas is added, especially it is most desirable that the oxygen containing gas is directly introduced into the gas phase or liquid phase in the polymerization vessel.

In the continuous batch system, it is desirably that a polymerization initiator, a solvent and a chain transfer agent are firstly fed into a polymerization vessel and oxygen is then supplied before the feed of butadiene is started. Of course, the addition of oxygen is possible during the polymerization and the molecular weight of the polymer immediately becomes low when oxygen is added. In order to obtain a low molecular weight polymer having the uniform molecular weight distribution, the former manner of the oxygen addition is preferable. In the continuous polymerization, oxygen may be added into the polymerization system either continuously or intermittently with suitable time-intervals.

When the polymerization is carried out successively according to the present invention with supplying oxygen into a polymerization vessel, the above-mentioned disadvantages can be eliminated and a low molecular weight polymer having a well controlled molecular weight can be obtained surprisingly. It is well known that oxygen reacts with a organic sodium compound to from the peroxide and the peroxide is then decomposed. However, it has not been made clear why oxygen gives such excellent effects on the polymerization of the present invention.

If the concentration of a polymerization initiator is too low in the method of the present invention, the polymerization sometimes does not start owing to the obstraction of a very small amount of impurities such as water in the polymerization system. On the contrary, the high concentration of a polymerization initiator is not economical because much initiator is not used during the polymerization. Therefore, the concentration of a polymerization initiator may be preferably within the range of 0.01 to 0.5 mole/l.

If the concentration of monomer is too low, the quantity of obtainable polymer per hour and per unit volume of a polymerization vessel becomes small so that it is disadvantageous in industrial production processes. On the contrary, if the concentration of monomer is too high, the concentration of obtained polymer becomes too high. In this case, the viscosity of the reaction mixture in the polymerization vessel increases so that the polymerization cannot be performed uniformly and, at the same time, the removal of heat of polymerization become difficult. Therefore, the concentration of a monomer is desirably maintained in the range of 5 to 400 g/l.

In connection with the chain transfer agent, if too much is used, a large quantity of the polymer having very low molecular weight is produced and the desired polymer having a number average molecular weight of 300 to 10,000 cannot be obtained with a good yield. On the other hand, if the quantity of a chain transfer agent is too small, a higher molecular weight polymer is detrimentally produced. In the method of the present invention, the preferable quantity of a chain transfer agent is in the range of 0.001 to 30 mole/l.

Another material used in the method of the present invention is an inert hydrocarbon solvent.

It is desirable that the foregoing reaction materials are sufficiently dried with an ordinary drying agent such as alumina, silica or activated carbon, before they are used for the polymerization.

In the method of the present invention, the pressure of the polymerization is not especially restricted generally the polymerization pressure is in the range of 0 to 50 Kg/cm$^2$, and particularly, the pressure may preferably be set to the overall pressure a monomer, a chain transfer agent, a solvent and so forth.

In order that those skilled in the art may better understand the present invention and the manner in which it may be practiced, the following specific examples and comparative examples are given.

COMPARATIVE EXAMPLES 1-4

A chain transfer agent of 40 moles of toluene and a solvent of 110 kg of benzene were completely dehydrated and they were then fed into a 250 l autoclave made of stainless steel as a polymerization vessel. Further, 8.5 moles of benzyl sodium as a polymerization initiator was added to the polymerization vessel and the vessel was sealed. Polymerization was carried out with stirring at 30° C. by gradually adding 54 kg of dried butadiene at a constant rate for 4.5 hours.

After all butadiene was fed, the stirring was continued for further 10 minutes. The polymerization mixture was then taken out from the polymerization vessel by displacing it with dried nitrogen gas that was prepared by evaporating liquid nitrogen. After the above polymerization process, the same process was repeated again by feeding the same quantities of toluene, benzene, a polymerization initiator (benzyl sodium) and butadiene into the same polymerization vessel under the same conditions.

The polymerization process were repeated four times. Alcohol was added to each of the obtained polymerization mixtures so as to stop the polymerization reaction and then polymers were recovered through a conventional process. The properties of the obtained polymers are shown in the following Table 1. It is to be noted that the above first polymerization process is referred to as "Comparative Example 1", the second polymerization process, as "Comparative Example 2", and so forth.

It is clear from Table 1 that a very high molecular weight polymer was sometimes produced and the reproducibility of the polymerization was not good, even though the same reaction conditions were employed. In this case, the viscosity of polymerization system was acceleratedly increased.

COMPARATIVE EXAMPLES 5-7

The above Comparative Example 4 was then followed by polymerization experiments of Comparative Examples 5 to 7, in which the same procedures as those in the above Comparative Examples 1 to 4 were repeated except that 120 moles of a chain transfer agent was used. The results of these Comparative Examples are also shown in the following Table 1.

It is clear from the results of Comparative Examples 5 to 7 that a lower molecular weight polymer can be of course obtained by adding more chain transfer agent to the polymerization system even when a high molecular weight polymer is produced in the previous procedures. However, it is difficult to obtain the nearly same molecular weights of polymers in the each polymerization procedure. That is, a larger quantity of a chain transfer agent than those in Comparative Examples 1 to 4, was used in Comparative Examples 5 to 7, however, the molecular weights of the obtained polymers were distributed.

EXAMPLES 1-4

By using the same reaction materials as those in Comparative Examples 1 to 4, the polymerization of butadiene was repeated four times in a like manner, except that 10.6 l of dried air (containing 1 mole % of oxygen relative to the polymerization initiator) was introduced into the polymerization system.

In a like manner as Comparative Examples 1 to 4, the produced polymers were recovered. The results are shown also in the following Table 1.

From the results of Examples 1 to 4, it will be understood that, when a given amount of oxygen is fed into the polymerization vessel according to the present invention, the polymers having well controlled molecular weight can be obtained with good reproducibility.

EXAMPLE 5 to 7

The polymerization of Example 4 was followed by the polymerization of Examples 5 to 7, in which the reaction was repeated in a like manner as the above Examples 1 to 4 except that the quantity of the chain transfer agent was increased to 120 moles. The results of Examples 5 to 7 are also shown in the following Table 1.

It will be understood from the results that the molecular weight of the polymers obtained in Examples 5 to 7 are lower than those of Comparative Examples 5 to 7 and that the reproducibility in view of the molecular weights of the polymer in Examples 5 to 7 are better than those of Comparative Examples 5 to 7.

TABLE 1

| Examples | Butadiene (%) Conversion | Number Average Molecular Weight of Polymer | Remarks |
|---|---|---|---|
| Comp. Ex. 1 | 95 | 3,200 | |
| Comp. Ex. 2 | 96 | 5,800 | |
| Comp. Ex. 3 | 99 | 11,000 | The viscosity of the polymerization system increased suddenly. |
| Comp. Ex. 4 | 97 | 8,500 | The viscosity increased. |
| Comp. Ex. 5 | 93 | 3,500 | |
| Comp. Ex. 6 | 95 | 1,300 | |
| Comp. Ex. 7 | 97 | 2,400 | |
| Example 1 | 93 | 2,100 | |
| Example 2 | 95 | 2,000 | |
| Example 3 | 94 | 1,980 | |
| Example 4 | 94 | 2,050 | |
| Example 5 | 88 | 800 | |
| Example 6 | 89 | 830 | |
| Example 7 | 91 | 790 | |

EXAMPLES 8–10

Sodium dispersion and monochlorobenzene were allowed to react together in toluene that was completely dried with silica-alumina and the reaction mixture was maintained at 80° C. for about 3 hours to obtain benzyl sodium. The solution consisting of 20 moles of benzyl sodium and 60 moles of toluene was introduced into a 500 l stainless steel polymerization vessel with a stirrer, and 237 kg of benzene that was completely dried with silica-alumina was further added to the polymerization vessel as a solvent. Then oxygen diluted with nitrogen (containing 0.51 mole % of $O_2$ relative to the polymerization initiator) was fed into the liquid phase of the polymerization system and 108 kg of butadiene was fed at a constant rate for 4.5 hours at 32° C. After the feeding of butadiene, the stirring was continued for further 10 minutes, and then the polymerization mixture was taken out from the polymerization vessel by displacing with dried nitrogen (Example 8).

Then the same quantities of the same reaction materials were polymerized in the same reaction vessel under the same reaction conditions (Example 9). This process was again repeated (Example 10).

Each products of the above polymerization processes was recovered through a ordinary process. The results are shown in the following Table 2.

TABLE 2

| Examples | Butadiene (%) Conversion | Number Average Molecular Weight of Polymer |
|---|---|---|
| Example 8 | 95.2 | 2,880 |
| Example 9 | 95.4 | 2,900 |
| Example 10 | 94.9 | 2,870 |

From the above results, it will be understood that, in accordance with the method of the present invention, polymers having well controlled molecular weights can be produced with excellent reproducibility.

EXAMPLES 11–13

A 250 l stainless steel polymerization vessel with a stirrer was fed with 10 moles of amyl sodium as a polymerization initiator, 50 moles of toluene and 150 l of n-hexane as a solvent that were completely dried with silica-alumina, and the contents were mixed together at 80° C. Then 22 l of air (containing about 2 mole % of $O_2$ relative to the polymerization initiator) was introduced into the liquid phase of the polymerization system and 54 kg of butadiene was fed at a constant rate for 4.5 hours into the polymerization vessel at 27° C. Immediately after the feeding of butadiene, the polymerization mixture was taken out from the polymerization vessel by displacing with dried nitrogen (Example 11).

The above process was repeated further twice with the same quantities of the same reaction materials under the same reaction conditions (Examples 12 and 13).

Each of the three polymerization products was recovered. The results are shown in the following Table 3.

TABLE 3

| Examples | Butadiene (%) Conversion | Number Average Molecular Weight of Polymer |
|---|---|---|
| Example 11 | 96.2 | 1,880 |
| Example 12 | 96.3 | 1,790 |
| Example 13 | 94.8 | 1,800 |

From the above results, it will be understood that polymers having well controlled molecular weights can be obtained with excellent reproducibility.

EXAMPLES 14–16

Sodium dispersion and monochlorobenzene were allowed to react together in toluene that was completely dried with silica-alumina and the reaction mixture was then maintained at 80° C. for about 3 hours to obtain benzyl sodium. Into 20 moles of the thus obtained benzyl sodium, oxygen diluted with nitrogen (containing 0.52 mole % of $O_2$ relative to the benzyl sodium) was blown. The prepared catalyst solution containing 80 moles of toluene was introduced into a 500 l stainless steel polymerization vessel with a stirrer and 243 kg of benzene that was completely dried with silica-alumina was fed into the polymerization vessel as a solvent. Further, 120 kg of butadiene was fed into the polymerization vessel at 32° C. at a constant rate for 4.3 hours. After the feeding of butadiene, the stirring was further continued for 10 minutes and the polymerization product was taken out from the polymerization vessel by displacing with dried nitrogen (Example 14).

The above process was repeated further twice with the same quantities of the same reaction materials under the same reaction conditions (Examples 15 and 16). Each of the three polymerization products were recovered. The results are shown in the following Table 4. From the results, it will be understood that, in accordance with the method of the present invention, polymers having well controlled molecular weights can be obtained with excellent reproducibility.

TABLE 4

| Example | Butadiene (%) Conversion | Number Average Molecular Weight of Polymer |
| --- | --- | --- |
| Example 14 | 89 | 2,490 |
| Example 15 | 93 | 2,530 |
| Example 16 | 95 | 2,510 |

It should be emphasized lastly that the specific examples described herein are intended as merely illustrative and in no way restrictive of the invention.

What is claimed is:

1. In a method for producing a low molecular weight polymer or copolymer by introducing a polymerization initiator consisting of metallic sodium or an organic sodium compound, an alkyl aryl compound as a chain transfer agent, an inert hydrocarbon as a solvent and a conjugated diolefin, mixture of conjugated diolefins or both a conjugated diolefin and a vinyl compound having anionic copolymerization activity with diolefin as a monomer or monomers into a polymerization vessel and polymerizing or copolymerizing therein successively at a temperature of 0° to 100° C., said alkyl aryl compound being represented by the general formula: $Ar-CR_1R_2H$ in which the symbol Ar is an aryl group and each of $R_1$ and $R_2$ is a hydrogen atom or an alkyl group having 1 to 20 carbon atoms, to produce a low molecular weight polymer or copolymer having a number average molecular weight of 300 to 10,000, the improvement which comprises employing 0.05 to 2 mole % per 1 mole of said polymerization initiator of oxygen in the polymerization whereby the polymerization can be carried out on a large scale with good reproducibility.

2. The method for producing a low molecular weight polymer or copolymer as claimed in claim 1, wherein oxygen is directly fed into said polymerization vessel.

3. The method for producing a low molecular weight polymer or copolymer as claimed in claim 1, wherein oxygen is fed into said polymerization vessel by previously adding it to a member selected from said monomer, chain transfer agent, solvent and polymerization initiator.

4. The method for producing a low molecular weight polymer or copolymer as claimed in claim 1, 2 or 3, wherein said organic sodium compound is of benzyl sodium type.

5. The method for producing a low molecular weight polymer or copolymer as claimed in claim 4, wherein said benzyl sodium type organic sodium compound is the one which is obtained by allowing an organic halide to react with metallic sodium and further allowing the reaction production to react with an alkyl benzene at a temperature of 0° to 120° C.

6. The method for producing a low molecular weight polymer or copolymer as claimed in claim 4, wherein said benzyl sodium type organic sodium compound is the one which is obtained by allowing an organic halide, metallic sodium and alkyl benzene to react together at a temperature of 0° to 100° C.

7. The method for producing a low molecular weight polymer or copolymer as claimed in claim 1, 2, 3, 4, 5 or 6, wherein said conjugated diolefin is a member selected from butadiene and isoprene, and said vinyl compound having anionic copolymerization activity is a member selected from styrene and α-methylstyrene.

8. The method of producing a low molecular weight polymer or copolymer as claimed in claim 1, wherein the amount of said oxygen is 0.51 to 2 mol percent per 1 mol of said polymerization initiator.

* * * * *